(12) United States Patent
DeMezzo

(10) Patent No.: US 6,398,635 B1
(45) Date of Patent: Jun. 4, 2002

(54) SHELLFISH OPENING KNIFE WITH HINGED BLADE GUARD

(75) Inventor: Gary F. DeMezzo, Milford, CT (US)

(73) Assignee: Inventioneers, LLC, Southbury, CT (US)

( * ) Notice: Subject to any disclaimer, the term of this patent is extended or adjusted under 35 U.S.C. 154(b) by 0 days.

(21) Appl. No.: 09/692,381

(22) Filed: Oct. 20, 2000

(51) Int. Cl.⁷ .......................... A22C 29/04; A47G 21/06
(52) U.S. Cl. .................... 452/17; 30/120.1; 33/555.1
(58) Field of Search ........................... 452/17, 13, 12; 30/120.1, 286, 295; 33/555.1, 555.2

(56) References Cited

U.S. PATENT DOCUMENTS

| | | | |
|---|---|---|---|
| 829,693 A | * | 8/1906 | Colford et al. ............... 452/17 |
| 1,062,525 A | * | 5/1913 | Ward ........................ 33/555.1 |
| 1,316,315 A | | 9/1919 | Mars |
| 1,352,108 A | | 9/1920 | Arthur |
| 3,761,976 A | * | 10/1973 | D'Amico |
| 3,846,908 A | | 11/1974 | Allievi |
| 4,133,078 A | | 1/1979 | Cromwell |
| 5,676,677 A | * | 10/1997 | Landis et al. |

FOREIGN PATENT DOCUMENTS

FR 0795160 A * 3/1935 .................. 452/17

* cited by examiner

Primary Examiner—Willis Little
(74) Attorney, Agent, or Firm—John H. Crozier

(57) ABSTRACT

In a preferred embodiment, a bivalve shellfish opening knife, including: a handle portion; a blade portion, having front and rear edges, extending from one end of the handle portion; a rear blade edge guard hingedly attached to the blade portion near a proximal end thereof in proximity to a proximal end of the handle portion; and the rear blade edge guard having defined therein a channel sized to accommodate therein the rear edge of the blade portion when the rear blade edge guard is rotated against the blade portion.

10 Claims, 5 Drawing Sheets

SHELLFISH OPENING KNIFE WITH HINGED BLADE GUARD

BACKGROUND OF THE INVENTION

1. Field of the Invention

The present invention relates to shellfish opening knives generally and, more particularly, but not by way of limitation, to a novel bivalve shellfish opening knife with a hinged blade guard.

2. Background Art

A basic bivalve shellfish opening knife is a relatively simple device and typically consists of a blade extending from a handle, the major axes of the blade and the handle being coaxial. In use, a person holds the handle of the knife in one hand, while a bivalve shellfish, such as a clam or oyster, is held in the other hand. The fingers of the hand holding the shellfish are curled around the back edge of the knife blade and pressure exerted by the fingers of that hand on the back edge of the knife blade is used to force the front edge of the knife blade into the shellfish between the two halves thereof. Once the knife enters the shellfish, pressure on the back of the knife is no longer required and the fingers of that hand can be relaxed. Once the adductor muscle holding the two halves has been severed, the shellfish can be opened with the hand holding the handle of the knife and the knife blade used to scrape the shellfish free from the shell.

A disadvantage of such an arrangement is that, especially for a person not used to opening a large number of shellfish at one time, placing pressure on the back edge of the blade of the knife with the fingers can become painful and may result in blistering.

Some types of knives for opening bivalve shellfish and other types of food items have been described in the following patents:

U.S. Pat. No. 1,316,315, issued Sep. 16, 1919, to Mars, and titled IMPLEMENT FOR USE IN REMOVING THE CONTENTS OF EGGS, describes a foldable knife that, when folded, the handle portion thereof folds over a portion of the cutting edge of the device located on the shank of the device.

U.S. Pat. No. 1,352,108, issued Sep. 7, 1920, to Arthur, and titled OYSTER SHUCKING KNIFE, describes such a knife that has a guard that can be folded over the blade so that the user can safely carry the knife in the user's pocket. The guard covers both edges of the blade of the knife.

U.S. Pat. No. 3,846,908, issued Nov. 12, 1974, to Allievi, and titled CLAM, OYSTER AND NUT CRACKER, describes an implement for opening such items that includes a leg portion hingedly attached to a blade portion at a point nearer the distal end of the blade portion than the proximal end of the blade portion, the item to be cracked to be inserted between the blade portion and the leg portion.

U.S. Pat. No. 4,133,078, issued Jan. 9, 1979, to Cromwell, and titled BIVALVE OPENER, describes a bivalve opener somewhat similar to the one described immediately above, in that a bivalve to be opened is placed in a vice-like arrangement.

None of the foregoing patented devices provides means for guarding the fingers of a person opening a bivalve shellfish.

Accordingly, it is a principal object of the present invention to provide a bivalve shellfish opening knife and method that protect the fingers of a user.

It is a further object of the invention to provide such knife and method that are easily used and do not increase the time required to otherwise open a shellfish.

It is an additional object of the invention to provide such a knife that can be economically constructed using conventional manufacturing techniques.

It is another object of the invention to provide means attached to the knife for conveniently assuring that only a minimum size shellfish will be opened.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a bivalve shellfish opening knife, comprising: a handle portion; a blade portion, having front and rear edges, extending from one end of said handle portion; a rear blade edge guard hingedly attached to said blade portion near a proximal end thereof in proximity to a proximal end of said handle portion; and said rear blade edge guard having defined therein a channel sized to accommodate therein said rear edge of said blade portion when said rear blade edge guard is rotated against said blade portion.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
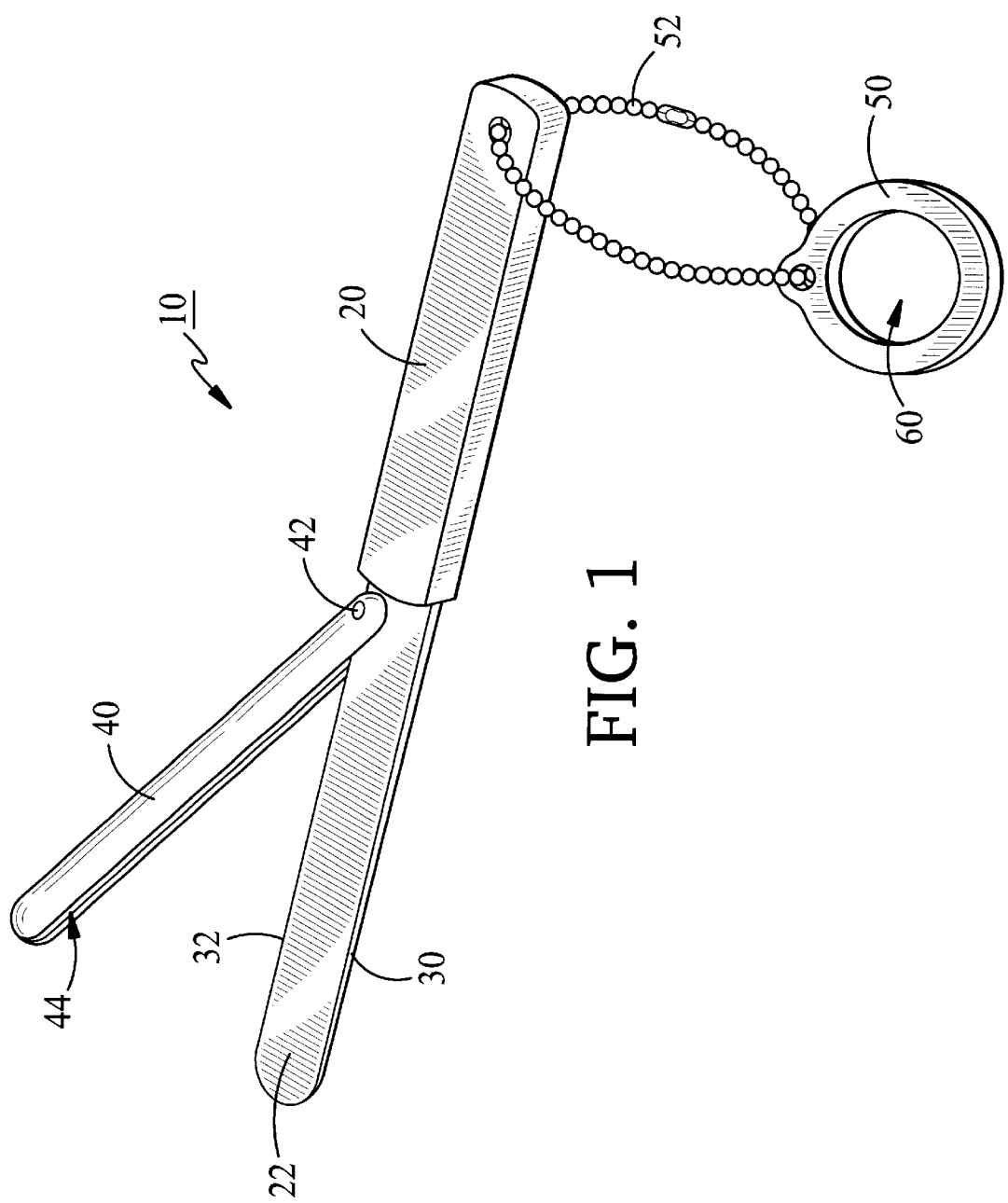
FIG. 1 is an isometric view of a bivalve shellfish opening knife constructed according to the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a bivalve shellfish opening knife, constructed according to the present invention, and generally indicated by the reference numeral 10. Shellfish opening knife 10 includes a handle portion 20 and a blade portion 22 extending from the handle portion, with the handle portion and the blade portion having generally coaxial major axes. Blade portion 22 includes a front edge 30 and a rear edge 32, the rear edge, in use, and as described above, having the fingers of one hand curled therearound to force the front edge between the two halves of a bivalve shellfish such as a clam or an oyster. As thus far described, the elements of shellfish opening knife 10 are conventional.

According to the present invention, an elongated, generally rounded, rear blade edge guard 40 is hingedly attached to the proximal end of blade portion 22 near handle portion by suitable means such as a rivet or pin 42 and has defined therein a channel 44 sized to closely accommodate therein rear edge 32 of blade portion 22 when blade guard 40 is rotated to a position against the blade portion. Rear blade guard 40 extends essentially the length of blade portion 22 or at least the portion that is grasped by the fingers of a user.

Completing the aspects of the invention, there is provided a shellfish measuring guide 50 attached to the distal end of handle portion 20 by means of a flexible chain 52. Measuring guide 50 includes defined therethrough an opening 60 sized so that only shellfish of a predetermined diameter can fit therethrough. By trying to pass a shellfish through measuring guide 50, a user of shellfish opening knife 10 can be assured that only shellfish of a predetermined minimum diameter will be opened.

FIGS. 2–5 illustrate the use of shellfish opening knife in opening a clam 70.

Figure 2:
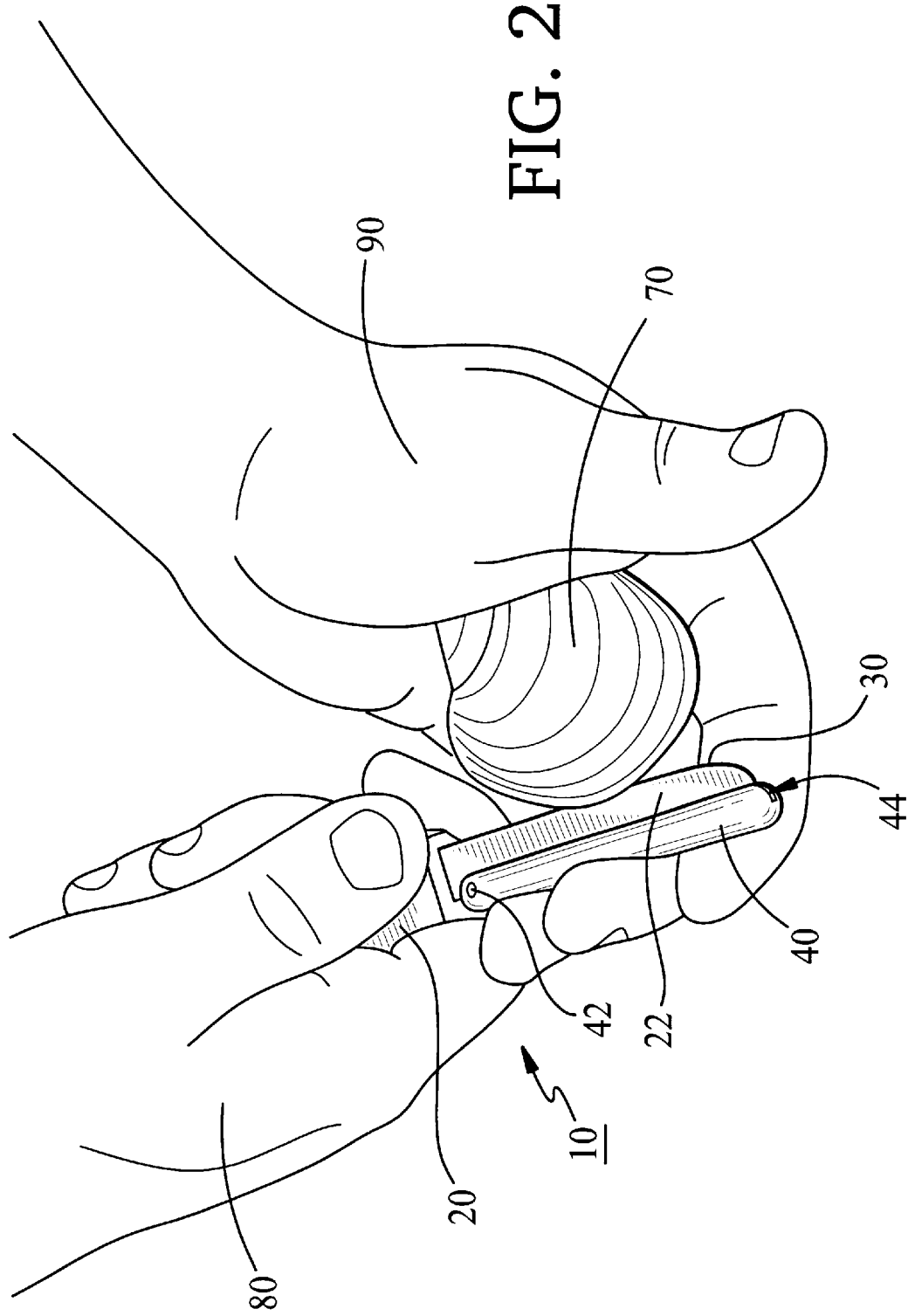
FIGS. 2–5 are isometric views showing the bivalve shellfish opening knife used in opening a clam.

Referring first to FIG. 2, handle portion 20 of shellfish opening knife 10 is grasped in the conventional manner in the right hand 80 of a user. Clam 70 is grasped in the conventional manner in the left hand 90 of the user. Rear blade edge 32 (FIG. 1) is fully inserted into channel 44 of rear blade edge guard 40 and at least some of the fingers of left hand 90 are curled around the rear blade edge guard. Pressure is relatively comfortably exerted on rear blade edge guard 44 to force front edge 30 of blade portion 22 between the two halves of clam 70.

Figure 3:
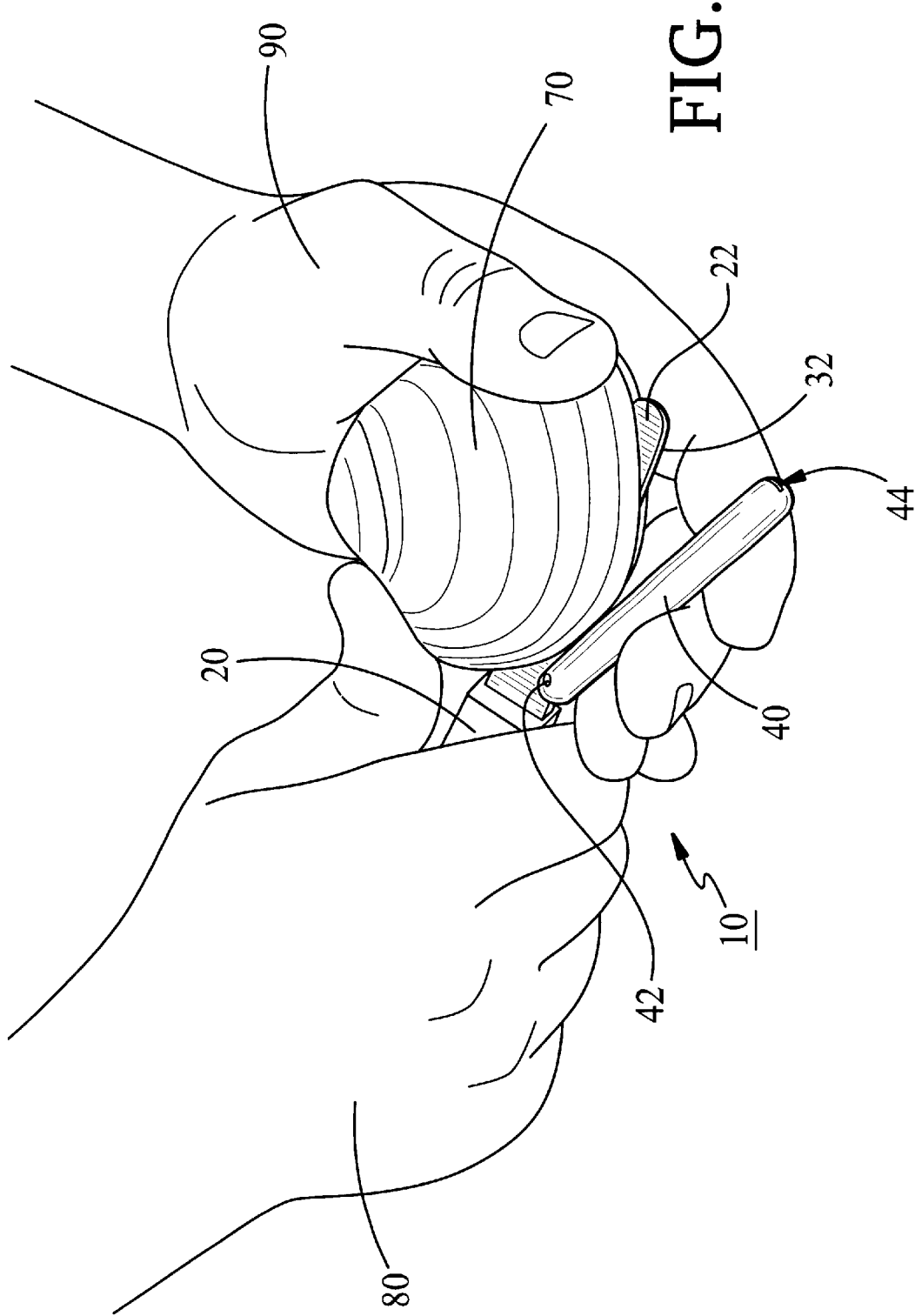

As seen on FIG. 3, blade portion 22 has entered clam 70, is severing the adductor muscle of the clam (not specifically shown on FIG. 3), rear blade edge guard 40 has been hingedly moved away from rear edge 32 of blade portion 22 by the contact of the rear blade edge guard with the clam 70, and the pressure exerted on the rear blade edge guard by the fingers of left hand 90 has been relaxed.

Figure 4:
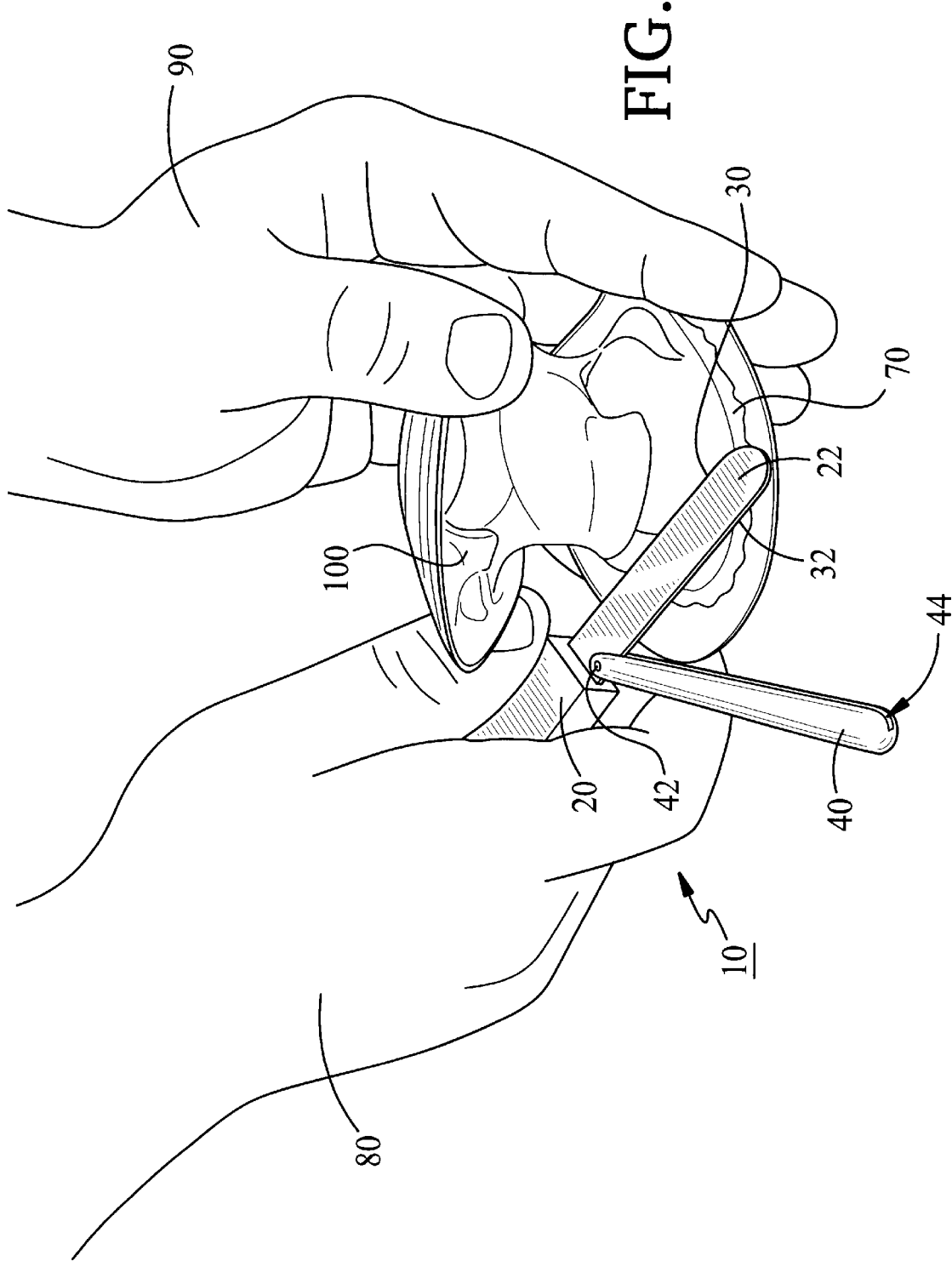
Figure 5:
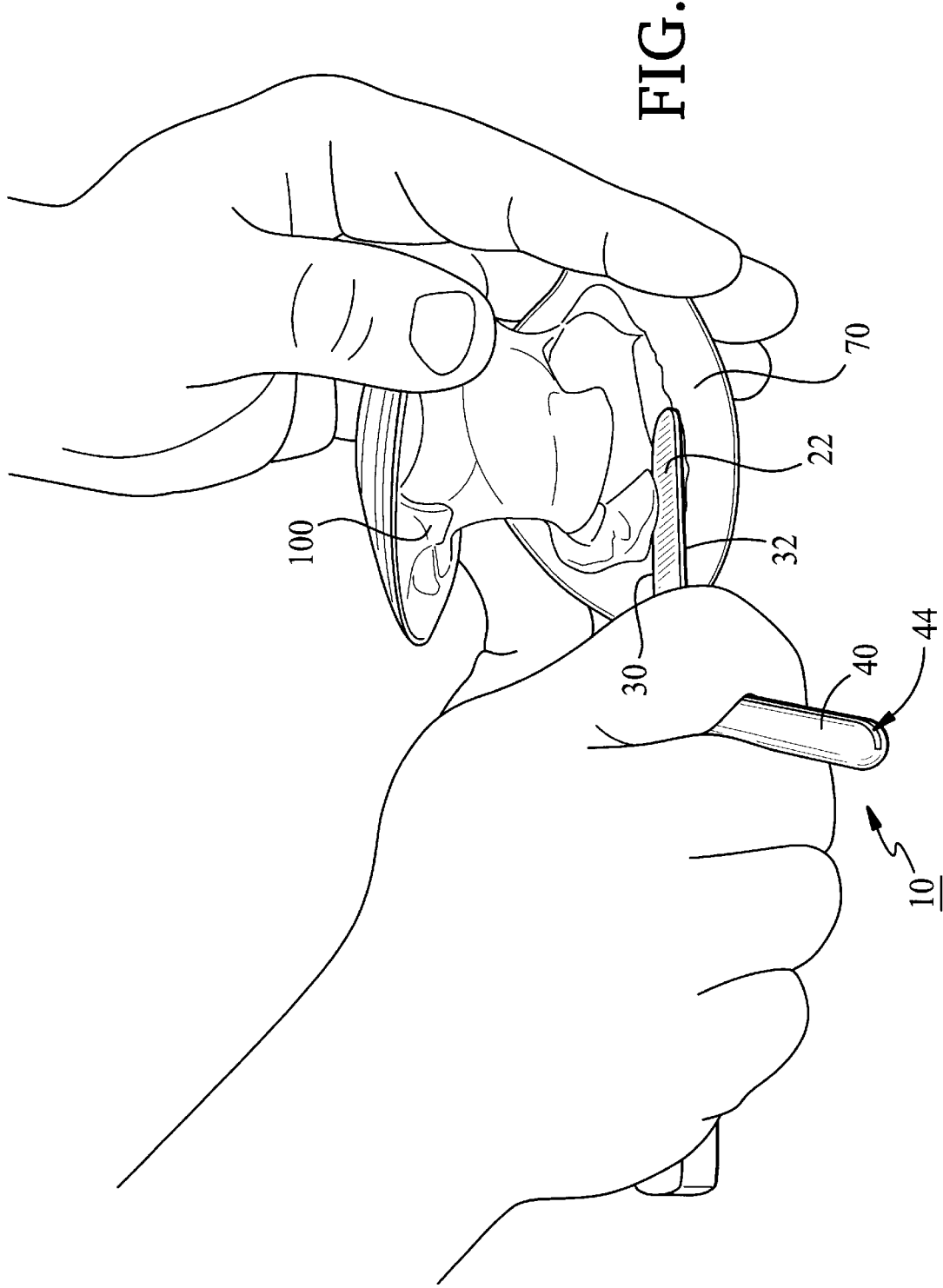

As seen on FIG. 4, the severing of adductor muscle 100 has permitted the halves of clam 70 to be hingedly moved apart and, as seen on FIG. 5, shellfish opening knife 10 is being used in the conventional manner to scrape away the contents of clam 70.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", "horizontal", "vertical", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction and/or method without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A bivalve shellfish opening knife, comprising:
   (a) a handle portion;
   (b) a blade portion, having front and rear edges, extending from one end of said handle portion;
   (c) a rear blade edge guard hingedly attached to said blade portion near a proximal end thereof in proximity to a proximal end of said handle portion; and
   (d) said rear blade edge guard having defined therein a channel sized to accommodate therein said rear edge of said blade portion when said rear blade edge guard is rotated against said blade portion.

2. A bivalve shellfish opening knife, as defined in claim 1, wherein: said rear blade guard extends along said rear edge of said blade portion at least the portion thereof having the fingers of a user curled therearound when opening said bivalve shellfish.

3. A bivalve shellfish opening knife, as defined in claim 1, further comprising: a bivalve shellfish diameter gauge attached to said handle portion.

4. A bivalve shellfish opening knife, as defined in claim 3, wherein said bivalve shellfish diameter gauge comprises: a member having defined therethrough an opening equal to a minimum diameter of said bivalve shellfish to be opened.

5. A bivalve shellfish opening knife, as defined in claim 4, wherein: said member is attached to said blade portion by means of a flexible chain.

6. A method of opening a bivalve shellfish, comprising:
   (a) providing a bivalve shellfish opening knife, including: a handle portion; a blade portion, having front and rear edges, extending from one end of said handle portion; a rear blade edge guard hingedly attached to said blade portion near a proximal end thereof in proximity to a proximal end of said handle portion; and said rear blade edge guard having defined therein a channel sized to accommodate therein said rear edge of said blade portion when said rear blade edge guard is rotated against said blade portion;
   (b) grasping said handle portion with one hand of a user;
   (c) grasping said bivalve shellfish in another hand of said user and curling at least some of fingers of said another hand around said rear blade guard with said rear edge of said rear blade guard inserted into said channel;
   (d) exerting pressure with said least some of fingers of said another hand against said rear blade guard to force said front edge of said blade portion between halves of said bivalve shellfish; and
   (e) permitting said rear blade guard to be hinged away from said bivalve shellfish by relaxing said pressure and by contact of said rear blade guard with said shellfish as said blade portion enters said bivalve shellfish.

7. A method of opening a bivalve shellfish, as defined in claim 1, further comprising: providing said rear blade guard extending along said rear edge of said blade portion at least the portion thereof having the fingers of a user curled therearound when opening said bivalve shellfish.

8. A method of opening a bivalve shellfish, as defined in claim 6, further comprising: providing a bivalve shellfish diameter gauge attached to said handle portion.

9. A method of opening a bivalve shellfish, as defined in claim 8, further comprising: providing said bivalve shellfish diameter gauge as a member having defined therethrough an opening equal to a minimum diameter of said bivalve shellfish to be opened.

10. A method of opening a bivalve shellfish, as defined in claim 9, further comprising: providing said member attached to said blade portion by means of a flexible chain.

* * * * *